United States Patent [19]

Lee

[11] Patent Number: 5,098,149

[45] Date of Patent: Mar. 24, 1992

[54] RETRACTABLE WINDSHIELD SHADE

[75] Inventor: Ling H. Lee, Memphis, Tenn.

[73] Assignee: Wagi L.P., Memphis, Tenn.

[21] Appl. No.: 748,757

[22] Filed: Aug. 19, 1991

[51] Int. Cl.⁵ .............................................. B60J 3/00
[52] U.S. Cl. ................................ 296/97.6; 296/97.8; 160/370.2
[58] Field of Search ................... 296/97.6, 97.8, 97.7; 160/370.2

[56] References Cited

U.S. PATENT DOCUMENTS

| | | | |
|---|---|---|---|
| 3,679,255 | 7/1972 | Nacarato | 296/97.6 |
| 3,877,745 | 4/1975 | Girard | 296/97.6 |
| 4,317,589 | 3/1982 | Kuss | 296/97.6 |
| 4,736,979 | 4/1988 | Harvey | 296/97.6 |

Primary Examiner—Robert R. Song

[57] ABSTRACT

For the purpose of shielding the interior of a parked vehicle from sunlight, this invention discloses a retractible windshield shade assembly mounted at the front edge of an existing sun visor. A reflective coating on the exterior surface of said shade reflects part of the radiant energy. It may be swung to the side to serve as a front side window shade.

3 Claims, 1 Drawing Sheet

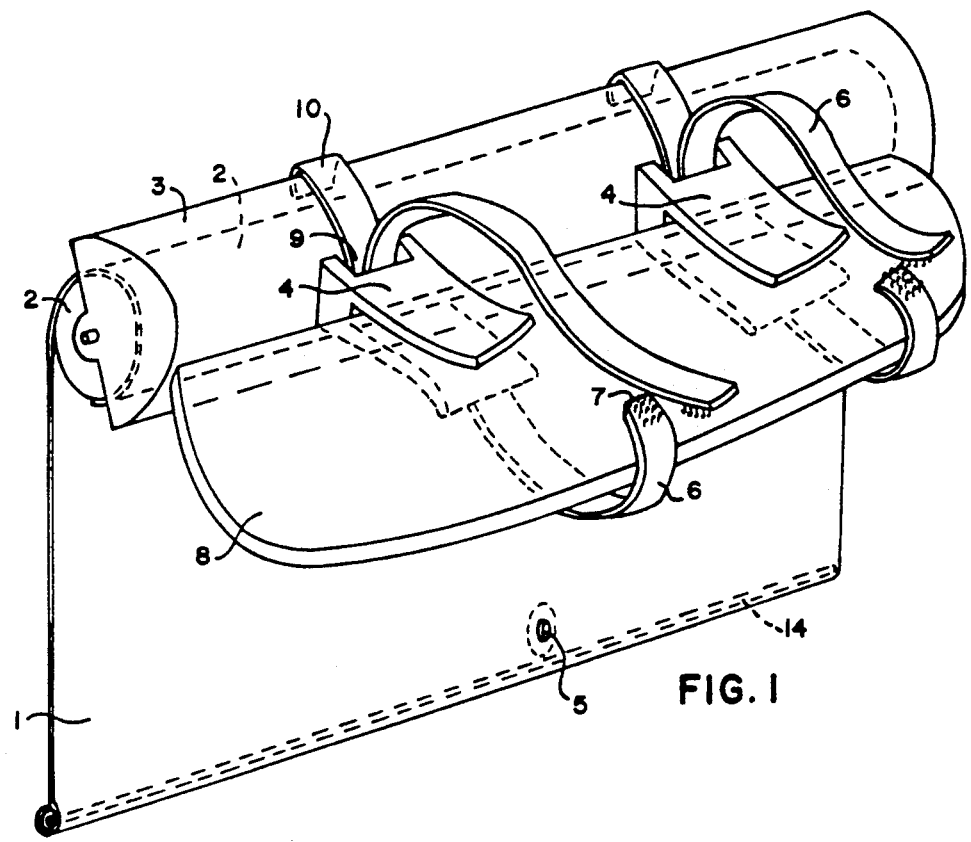
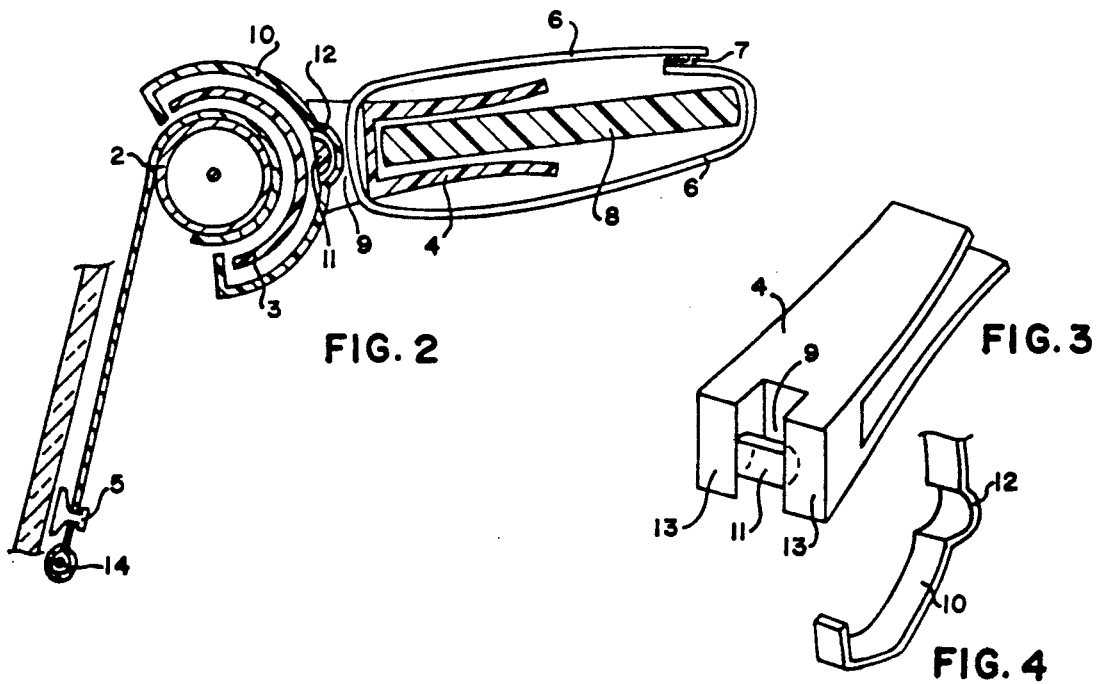

RETRACTABLE WINDSHIELD SHADE

FIELD OF THE INVENTION

The invention generally relates to a windshield shade for a parked vehicle. More particularly, it discloses a conveniently retractible windshield shade mounted at the front edge of a sun visor to shield sunlight from entering the interior of a vehicle. When the assembly and its attached sun visor are swung to the side, it also can serve as a front side window shade.

BACKGROUND AND DISCLOSURE OF THE INVENTION

In a hot and sunny environment, sunlight through the windshield of a parked vehicle increases the interior temperature and damages the fabric of the dashboard and front seats. There are various foldable cardboard devices to be placed behind the windshield. A search in the U. S. Patent Office under class/subclass 296/97 showed U.S. Pat. No. 3,584,910 by Lupal disclosing a retractible screen assembly attached to the side window or the bottom surface of a sun visor. Also U.S. Pat. No. 2,747,927 by Burkhead disclosed a retractible sun visor mounted behind a windshield with hardware components.

The present invention discloses a more improved windshield shade over other in several features:

(a) It is less bulky and convenient than foldable/unfoldable cardboard devices.
(b) Comparing with the Lupal device which is mounted at the bottom of the sun visor, this invention places the assembly at the more inconspicuous place at the front edge of the sun visor further away from the occupants' foreheads.
(c) No drilling into the body of a vehicle is necessary.
(d) A reflective coating on the anterior surface of the shade radiates part of the sun's ray across the windshield to the exterior.
(e) The normal sun visor function is not affected.

To accomplish the stated purposes, the preferred embodiment is described in the following drawings and specifications and further defined in the claims.

DESCRIPTION OF THE DRAWINGS

FIG. 1 is a perspective view Of the entire preferred embodiment as attached to a sun visor.

FIG. 2 is a sectional view one of the embodiment at the plane of an alligator clamp.

FIG. 3 is a perspective view of an alligator clamp.

FIG. 4 is a perspective view of a C-band.

DESCRIPTION OF THE PREFERRED EMBODIMENT, IT'S COMPONENTS, AND THEIR FUNCTIONS

Referring to FIG. 1 and FIG. 2, 1 and 2 together depict the window shade sub-assembly where 1 represents a rectangular, flexible, and opaque shade having a width approximating that of one half of a windshield and a deployed length approximating the height of a windshield; and where 2 represents an elongated and horizontally disposed window shade take-up roller which is well known as a houseware. 3 represents an elongated and horizontally disposed trough-shaped shell made to be slightly longer and larger than said take-up roller 2 in order to receive and mount therein said take-up roller 2 in said trough-shape shell's front-facing cavity.

Referring to FIG. 1, FIG. 2, and FIG. 4, plurality of C-bands 10 are made to conform to the posterior convex curve of trough-shaped shell 3. Each end of C-band 10 is made to have a short and inward bent to fit over an edge of shell 3 and, therefore, to allow C-band 10 to be snapped onto shell 10. Referring to FIG. 2 and FIG. 4, a small substantially semi-circular convex bent 12 at the mid-section of C-band 10 is provided serving as the tunnel component of a hinge.

Referring to FIG. 1, FIG. 2, and FIG. 3, each of plurality of alligator clamps 4 has a base and two jaws. As depicted, the base of each clamp 4 is bifurcated with the slot 9 of the bifurcation 13 oriented vertically. At the mid-portion of slot 9 is provided, as integral part of clamp 4, a horizontally oriented small rod 11 fitting the cavity of said semi-circular bent 12 of C-band 10. The hinge assembly, therefore, allows some degree of pivotal motion between shell 10 and clamps 4.

Referring to FIG. 1 and FIG. 2, after Clamp 4 engages sun visor 8, fabric straps 6 go through slot 9 and then wrap around the width of built-in sun visor 8 to further fasten the entire assembly at the front edge of sun visor 8, facilitated by the loop-and-hook fastening device 7 on opposing surfaces at the ends of strap 6.

Referring to FIG. 1 and FIG. 2, a small rigid rod 14 is mounted at the lower edge of shade 1 to facilitate deployment and pulling of shade 1. Plurality of suction cups 5 having their open ends facing forward are mounted near the lower edge of shade 1 to engage the lower interior surface of windshield 6.

Not shown in the drawings is a reflective coating on the exterior surface of shade 1 to reflect part of sun's radiant energy to the exterior across windshield 6.

During installation, the positions of C-bands 10 may be adjusted along the length of shell 3 to fit a particular sun visor and windshield configuration. Because of the built-in hinge action between clamps 4 and shell 3, the normal sun visor function is not affected. When the sun visor and the embodiment together are swung toward the side window, the assembly functions as side window shade.

Although the present invention has been described and illustrated with respect to a preferred embodiment and preferred use, it is not to be limited since modification and changes can be made therein, which are within the full intent, scope, and spirit of the invention.

I claim:

1. For the purpose of shielding the interior of a parked vehicle from sunlight across the vehicle windshield, a shading assembly comprising:

a) a horizontally disposed window shade subassembly having a take-up roller mechanism and a flexible, opaque, retractible, and rectangular curtain operatively connected to said roller the width of which approximating one half the width of said windshield and a deployed length of which approximating the height of said windshield, b) an elongated and horizontally disposed trough-shaped shell having an anterior concave space and a posterior convex surface, said trough-shaped shell having a length slightly longer and a size slightly larger than said window shade subassembly, and said trough-shaped shell receiving and mounted therein said window shade subassembly within said anterior concave space, c) plurality of suction cups permanently and fixedly mounted near a free end portion of said curtain, said suction cups being disposed to face forward to engage the interior lower surface of said windshield when said curtain is deployed.

d) a small rigid rod mounted along the free end portion of said curtain to facilitate deployment of said curtain, e) plurality of C-bands fitting said posterior convex surface of said trough-shaped shell, each end of said C-bands being provided with a small and inward bent to fit over upper and lower edges of said trough-shaped shell, said C-band's position, therefore, being adjustable along the length of said trough-shaped shell, and said C-band at its mid-section having a small and substantially semi-circular convex curvature, f) plurality of alligator clamps each having a base at one end and two jaws at the other end, said base being bifurcated with an open slot oriented vertically, said bifurcated base having an integrally built-in small rod across the said slot serving as a hinge pin for said semi-circular convex curvature of said C-band, and said two jaws fastening said shade assembly at a front edge of a sun visor, g) fabric straps each of which passing through said slot of each said base of each said alligator clamp to further fasten said shading assembly at the front edge of the sun visor, facilitated by loop-and-hook fastening device on opposing surfaces at the ends of each said strap.

2. The shade assembly as set forth in claim 1 serving as a front side window shade when the sun visor and said shade assembly are swung to said side window.

3. The shade assembly as set forth in claim 1, wherein an anterior surface of said curtain is coated with a reflective material to reflect part of the incident sunlight.

* * * * *